(12) United States Patent
Gaj-Jablonski

(10) Patent No.: US 10,513,927 B2
(45) Date of Patent: Dec. 24, 2019

(54) INTERNAL COMBUSTION ENGINE

(71) Applicant: Wojciech Gaj-Jablonski, Oakville (CA)

(72) Inventor: Wojciech Gaj-Jablonski, Oakville (CA)

(*) Notice: Subject to any disclaimer, the term of this patent is extended or adjusted under 35 U.S.C. 154(b) by 0 days.

(21) Appl. No.: 15/556,426

(22) PCT Filed: Mar. 7, 2016

(86) PCT No.: PCT/PL2016/000026
§ 371 (c)(1),
(2) Date: Sep. 7, 2017

(87) PCT Pub. No.: WO2016/144198
PCT Pub. Date: Sep. 15, 2016

(65) Prior Publication Data
US 2018/0038228 A1    Feb. 8, 2018

(30) Foreign Application Priority Data

Mar. 7, 2015  (PL) .......................... 411508

(51) Int. Cl.
*F02B 75/32*  (2006.01)
*F01B 9/02*  (2006.01)
(Continued)

(52) U.S. Cl.
CPC .............. *F01B 9/026* (2013.01); *F01B 1/062* (2013.01); *F02B 47/02* (2013.01); *F02B 75/28* (2013.01);
(Continued)

(58) Field of Classification Search
CPC ........ F02B 75/28; F02B 75/222; F02B 75/32; F02B 75/002; F02B 75/282; F02B 47/02;
(Continued)

(56) References Cited

U.S. PATENT DOCUMENTS 2,295,037 A * 9/1942 Hedges ................... F01P 1/04
                                                123/41.35
2,317,167 A * 4/1943 Baer ...................... F02B 75/002
                                                123/63

(Continued)

FOREIGN PATENT DOCUMENTS

DE    202005014320    12/2005
GB         16116       7/1914
PL        212301       9/2012

OTHER PUBLICATIONS

International Search Report for PCT/PL2016/000026, Completed by the European Patent Office dated Jun. 21, 2016, 4 Pages.

*Primary Examiner* — Hai H Huynh
(74) *Attorney, Agent, or Firm* — Own Innovation (57) ABSTRACT

An internal combustion engine for use in land, aerial and water vehicles and various kinds of machinery. A first version of the engine has a cylinder with the inlet channel of compressed air and the outlet exhaust channel situated in the middle of it. In the cylinder head as well as in the partition there are the fuel injector, the water injector and the ignition element. In the middle of the partition the slide bearing is embedded, through which the tappet rod goes. The upper end of this rod is attached to the bilateral piston, whereas its lower end is connected to the connecting rod. The water injectors are powered from the water container through the heating element and the metering device. A second version the engine has a plurality of cylinders in a radial orientation.

9 Claims, 5 Drawing Sheets

(51) Int. Cl.
*F02B 47/02* (2006.01)
*F01B 1/06* (2006.01)
*F02B 75/28* (2006.01)
*F02M 25/022* (2006.01)
*F02M 25/03* (2006.01)

(52) U.S. Cl.
CPC ......... *F02M 25/0222* (2013.01); *F02M 25/03* (2013.01)

(58) Field of Classification Search
CPC .. F02B 41/04; F02M 25/022; F02M 25/0222; F02M 25/03; Y02T 10/121; F16C 9/04; F01B 9/026; F01B 1/062
USPC .................................. 123/46 A, 197.3, 197.4
See application file for complete search history.

(56) References Cited

U.S. PATENT DOCUMENTS

| | | | |
|---|---|---|---|
| 2,715,685 A * | 8/1955 | Brown .................... | F04B 35/04 |
| | | | 290/1 A |
| 9,010,287 B2 * | 4/2015 | Morreim ............... | F02B 75/002 |
| | | | 123/53.6 |
| 2004/0040305 A1 | 3/2004 | Helm | |
| 2004/0099229 A1 | 5/2004 | Gelfand | |
| 2012/0240578 A1 | 9/2012 | Lawes | |
| 2018/0252105 A1 * | 9/2018 | Gaj-Jablonski ........... | F01B 7/16 |

* cited by examiner

INTERNAL COMBUSTION ENGINE

CROSS-REFERENCE TO RELATED APPLICATION

This application is the U.S. national phase of PCT Application No. PCT/PL2016/000026 filed on Mar. 7, 2016, which claims priority to PL Patent Application No. P.411508 filed on Mar. 7, 2015, the disclosures of which are incorporated in their entirety by reference herein.

TECHNICAL FIELD

The object of the invention is the internal combustion engine double-acting piston intended to be used in land, aerial and water vehicles as well as in various kinds of machinery.

BACKGROUND

The internal combustion engine which is known from the U.S. Pat. No. 6,854,429 patent description has a double-acting piston, contains at least one cylinder with a double symmetrical piston situated inside that divides the free space of the cylinder into two combustion chambers. Bilateral closing cylinder heads are equipped with fuel inflow valves and valves that carry off exhaust as well as with an ignition element in the form of a spark plug or a glow plug. There is a piston rod stiffly embedded on the one side of the double piston, which is transferred outside the cylinder through a sealed opening in a partition that separates the cylinder from an engine case. The end of this rod is connected to a yoke of an anti-roll bar, whereas the anti-roll bar is connected to a power transfer yoke, and in the place where these two yokes are connected there is an arm of a stabilizing limiter attached in a oscillating way, which by its other side is connected to the engine case. The power transfer yoke by its other side is connected to a crankshaft, which constitutes a part of a crank unit, on whose one end a flywheel is located and on the other side there is a timing wheel connected via a timing strap to a camshaft. The oil circulation system in the lubrication system has a task to supply oil to the space formed between a cylindrical necking in the middle of the piston and the central part of the cylinder, from where oil is subsequently transferred towards an oil sump via the appropriate system of channels, which are situated inside the piston, and it goes farther via the channel located on the axis of a piston rod. Cams embedded on the camshaft steer accordingly by pistons of head valves that close the cylinder in compression with work of spark plugs. The engine operates in the four-stroke cycle in an alternate manner for each combustion chamber per 180 degrees of a crankshaft rotation.

Moreover, the piston and crank system is known from the PL 212301 patent description in the two-stroke combustion engine, which has an engine case with a built-in valve guide and a cylinder which is fastened to it. The guide is a base for the cylinder with a piston located in it, whose motion is contactless. The guide slide, to which the piston is attached motionlessly, moves in the guide by the reciprocating motion. On the moving guide slide a sealing scraper ring is located, which prevents oil from getting to a suction chamber. Additionally, in the known piston and crank system the piston guide is connected to one part of a connecting strip through a slide bearing. The connecting strip consists of two parts associated telescopically. On the other side of the connecting strip a sliding sleeve moves, which is linked in an oscillating way to a connecting rod of the crankshaft through slide bearings and also it is linked to a connecting rod of an eccentric through the slide bearing. The eccentric is powered from the crankshaft through a drive wheel and a chain transmission. The connecting rod of the eccentric is attached to the eccentric in an oscillating way, which moves the sliding sleeve on the connector strip by the reciprocating motion.

SUMMARY

In the first variant of the engine according to the invention the cylinder is fastened to the engine case and it is closed from above by the cylinder head, while from below it is closed by the partition, whereas in the middle of the cylinder there is the inlet channel of compressed air as well as the outlet exhaust channel. There are at least one fuel injector, at least one water injector and at least one ignition element in the form of a spark plug or a glow plug in the cylinder head as well as in the partition, and they are all situated in pairs. In the middle of the partition the linear sidle bearing that is resistant to high temperatures is embedded and from below it is equipped with a sealing element. The piston rod in the form of a ground shaft together with the sealing element are led through the linear slide bearing. The upper end of the piston rod is stiffly connected to the bilateral reciprocating piston, whereas its lower end is connected to the connecting rod in an oscillating manner that is situated inside the engine case in the crankcase and which is rotationally linked to the crank of the crankshaft. The piston has a pit on the whole circuit of its surface and moreover it has sealing rings situated on its edges. Above the sealing element on the remaining part of the slide bearing, between its wall and the surface of the piston rod shaft, there is a lubricating passage. The piston rod shaft has an internal oil channel, which carries lubricating oil from the crankcase space to the cylinder space with the use of the intake opening in the lower part of the piston rod shaft as well as the outlet opening located in the pit of the piston. Each water injector is connected to the joint water heating element, which is coupled with an exhaust manifold, via a metering device assigned to it, while the water heating element is powered by water derived from a water container. All these connections are realized with the help of water lines.

In the second variant of the engine according to the invention three cylinders in a radial unit are attached to the engine case. Each cylinder, similarly as in the first variant, is closed from above by the cylinder head, from below by the partition, whereas in the middle of each of them there is at least one inlet channel of compressed air as well as at least one outlet exhaust channel. In the head of each cylinder and in its partition there are at least one fuel injector, at least one water injector and at least one ignition element in the form of a spark plug or a glow plug and they are all situated in pairs. In the middle of the partition the linear sidle bearing that is resistant to high temperatures is embedded and from below it is equipped with a sealing element. The piston rod in the form of a ground shaft together with the sealing element are led through the linear slide bearing. The upper end of the piston rod is stiffly connected to the bilateral reciprocating piston located in the cylinder, whereas its lower end is connected to the connecting rod in an oscillating manner, placed inside the engine case in the crankcase, which is rotationally connected to the crank of the crankshaft via a pin in the intermediary plate that is placed on the crank of this crankshaft. Each piston has a pit on the whole circuit of its side surface and moreover it has sealing rings situated on its edges. Above the sealing element on the remaining part of the slide bearing, between its wall and the surface of the piston rod shaft, there is a lubricating passage. The piston rod shaft has an internal oil channel, which carries lubricating oil from the crankcase space to the cylinder space with the use of the intake opening in the lower part of the piston rod shaft as well as the outlet opening located in the pit of the piston. Each water injector is connected to a metering device assigned to it, which is attached to joint water heating element powered from a water container. The joint heating element is coupled with the exhaust manifold embedded on the exhaust port. All these connections are realized with the help of water lines.

One of advantages of the solution according to the invention is the combination of two positive features of the engine that has no valves, together with the known solution of the engine with the double piston located inside, which divides the free space of the cylinder into two combustion chambers, in which two work cycles occur during a full turn of a crankshaft. The other benefit of this solution is the complete and effective disconnecting of the zone of the cylinder combustion chambers from the space of the crankcase, which prevents oil from being transferred to expelled combustion products. With regard to that, there is no need to employ a generally used resonant exhaust system. It contributes to the fact that the described engine is an ecological device, which corresponds to the highest standards of devices of this type.

The next feature of the engine solution according to the invention is its simple construction, which does not require many complex extra elements, and owing to the requirement of low air pressure used to scavenge the cylinder space it is sufficient to use a small fan instead of a compressor that is usually used. This, as well as no need to use a complicated timing system of valves work, which is employed in the known solution, have a result that the engine according to the invention maintains a positive power to weight ratio. Therefore, this engine can be particularly useful in configuration of a radial engine and may be used in light aircraft construction, powerboats and other similar devices. Furthermore, the engine that is being descried may be, depending on the choice of an ignition element, supplied by virtually all available liquid fuels or fuel gases, including gasoline, diesel oil as well as hydrogen.

BRIEF DESCRIPTION OF THE DRAWINGS

The object of the invention is presented on the realization examples in the picture, in which.

DETAILED DESCRIPTION

Figure 1:
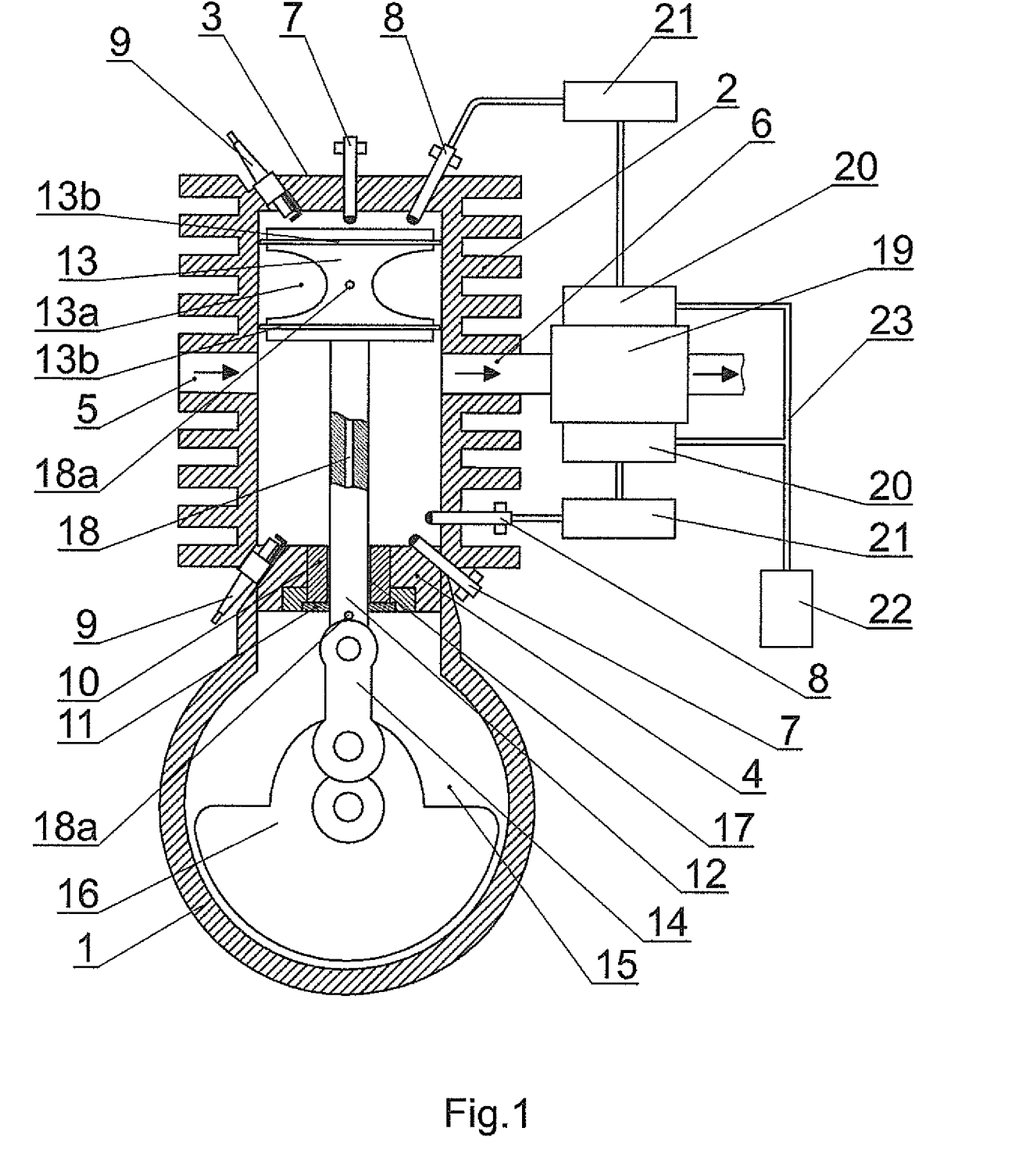
FIG. 1 shows schematic intersection of the single-cylinder engine together with the feed system of water injectors.

In accordance with the first example of the invention realization, shown in FIG. 1, the cylinder 2 is fastened to the engine case 1 the cylinder 2 is closed from above by the cylinder head 3, whereas from below it is closed by the partition 4, while in the middle of the cylinder 2 there is the inlet channel of compressed air 5 as well as the outlet exhaust channel 6. In the cylinder head 3 and in the partition 4 the fuel injector 7 and the water injector 8 are situated in pairs as well as there is the ignition element 9 in the form of the spark plug. In the middle of the partition 4 the linear slide bearing 10 resistant to high temperatures is embedded and it is equipped from below with the sealing element 11. Through the linear slide bearing 10 together with the sealing element 11 the piston rod 12 is led in the form of the steel ground shaft. The upper end of the piston rod 12 is stiffly connected to the bilateral reciprocating piston 13 situated in the cylinder 2, whereas the lower end is connected to the connecting rod 14 in an oscillating manner, which is located inside the engine case 1 in the crankcase 15 and which is rotationally connected to the crank of the crankshaft 16. The piston 13 on the whole circuit of its side surface has the pit 13a, and moreover it has sealing elements 13b located on its edges. Above the sealing element 11 on the remaining length of the slide bearing 10, between its wall and the surface of the shaft of the piston rod 12, the lubricating passage 17 is formed, in which the present thin layer of lubricating oil constitutes a kind of additional sealing of the slide bearing 10. The piston rod shaft 12 has the internal oil channel 18, which transfers lubricating oil from the crankcase space 15 to the cylinder 2 space with the use of the intake opening 18a in the lower part of the piston rod shaft 12 and the outlet opening 18b, located in the pit 13a of the piston 13. Each water injector 8 is connected to the joint heating element 20, coupled with the exhaust manifold 19, via the metering device 21 that is assigned to it, while the heating element of water 20 is powered from the water container 22. All these connections are realized with the help of water lines 23.

Figure 6:
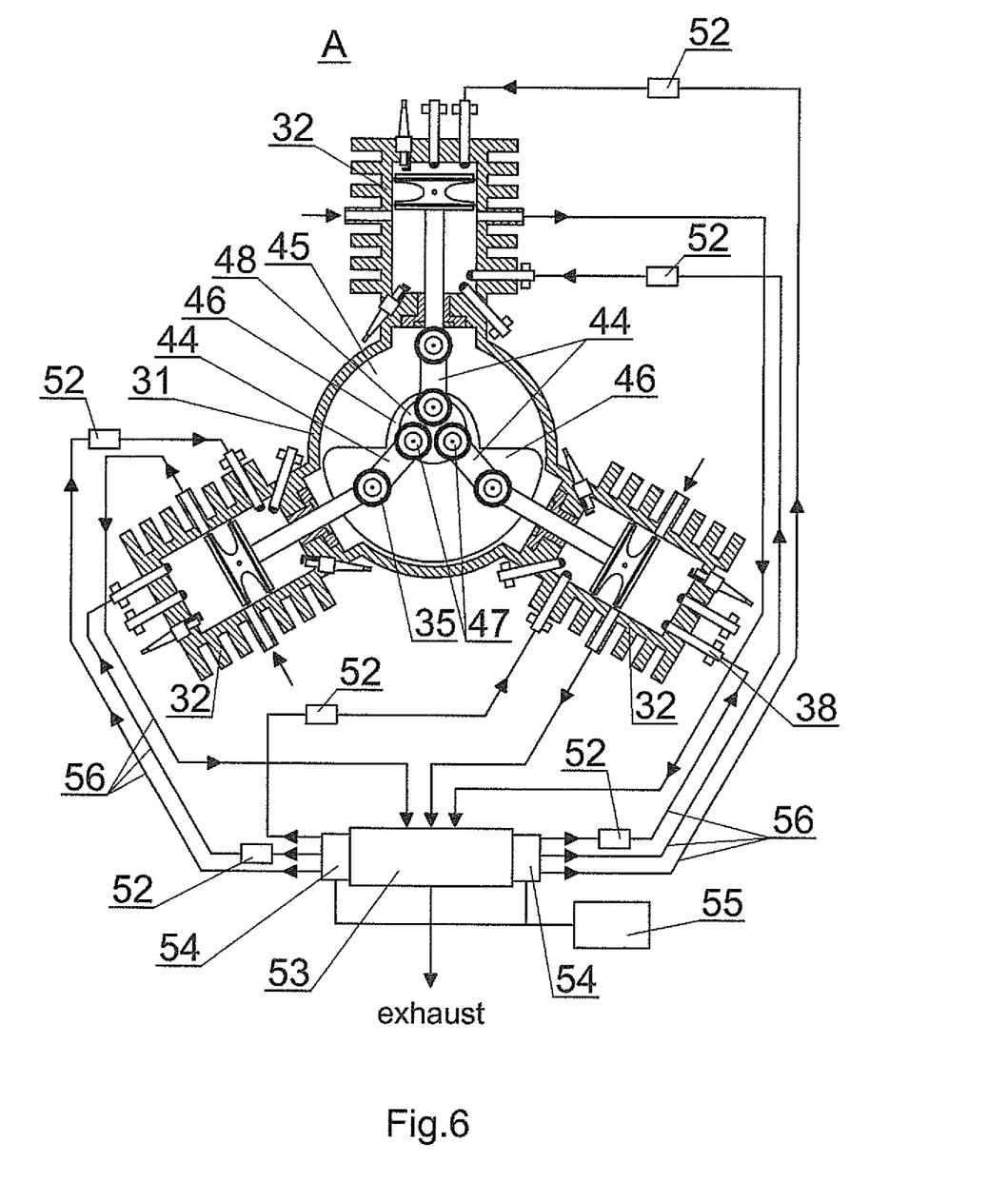
FIG. 6 presents schematic intersection of the radial engine together with the feed system of water injectors, and FIG. 7 one of its cylinders is shown in enlargement.
Figure 7:
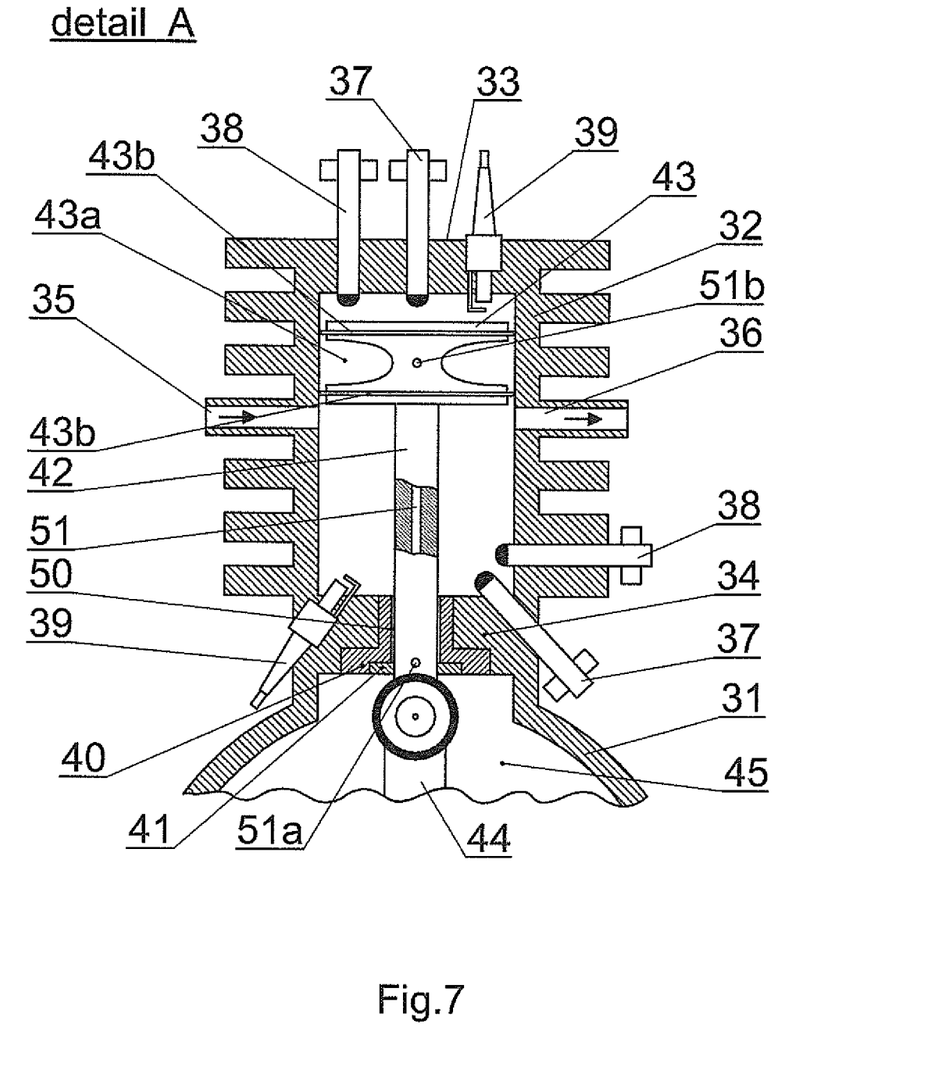

In accordance with the second example of the invention realization, shown in FIG. 6, three cylinders 32 in the radial system are fastened to the engine case 31, each of them is closed from above by the cylinder head 33, whereas from below by the partition 34, while in the middle of each of them there is one inlet channel of compressed air 35 and one outlet exhaust channel 36. In the head 33 of each cylinder 32 as well as in its partition 34 the fuel injector 37, the water injector 38 and the ignition element 39 in the form of the spark plug are situated in pairs. In the middle of each partition 34 the linear slide bearing resistant to high temperatures 40 is embedded, which is equipped from below with the sealing element 41. The piston rod 42 in the form of the steel ground shaft together with the sealing element 41 are led through the linear slide bearing 40. The upper end of the piston rod 42 is stiffly connected to the bilateral reciprocating piston 43 situated in the cylinder 32, whereas its lower end is connected to the connecting rod 44 in an oscillating way, located inside the engine case 31 in the crankcase 45, which is then rotationally connected to the crank of the crankshaft 46 via the pin 47 assigned to it in the intermediary plate 48, which is embedded on the crank of this crankshaft. Each piston 43 has the pit 43a on the whole circuit of its side surface, and moreover it has sealing rings 43b embedded on its edges. Above each sealing element 41, on the remaining part of the slide bearing 40, between its wall and the surface of the piston rod shaft 42, the lubricating passage 50 is formed, in which the present thin layer of lubricating oil constitutes a kind of additional sealing of the slide bearing 40. Each shaft of the piston rod 42 has the internal oil channel 51, which transfers lubricating oil from the crankcase space 45 to the cylinder space 32 with the use of the intake opening 51*a* in the lower part of the piston rod shaft 42 and the outlet opening 51*b*, which is situated in the pit 43*a* of the piston 43. Each water injector 38 is connected to the metering device 52 assigned to it that is attached to the joint heating element 54, powered from the water container 55, which is embedded on the exhaust manifold 53 fastened to outlet exhaust channel 36. All these connections are realized with the help of water lines 56.

Figure 2:
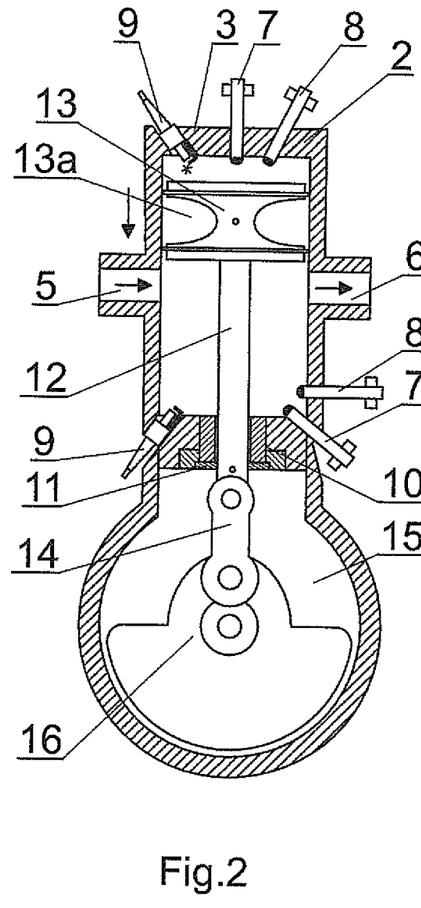
FIG. 2 illustrates the compression cycle in the upper combustion chamber and scavenging in the lower combustion chamber.
Figure 3:
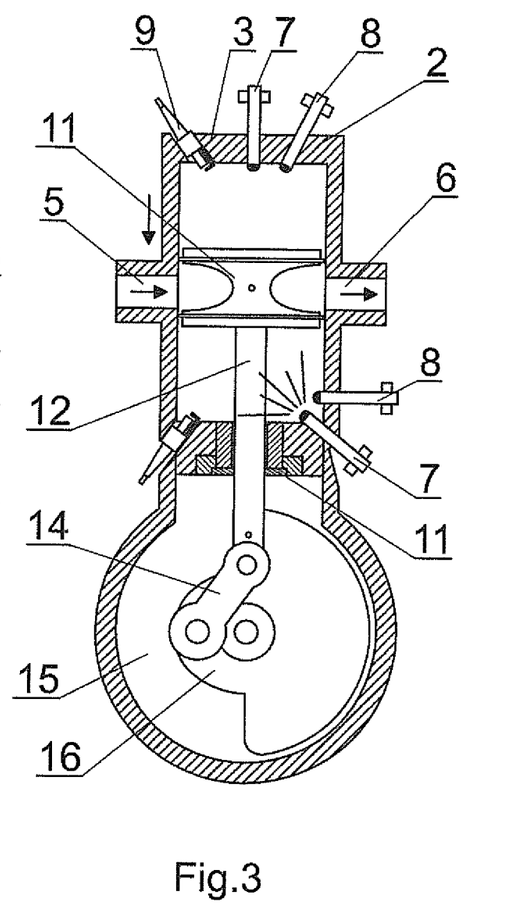
FIG. 3 shows the engine in the course of the piston motion towards BDC as well as the fuel injection into the lower combustion chamber.
Figure 4:
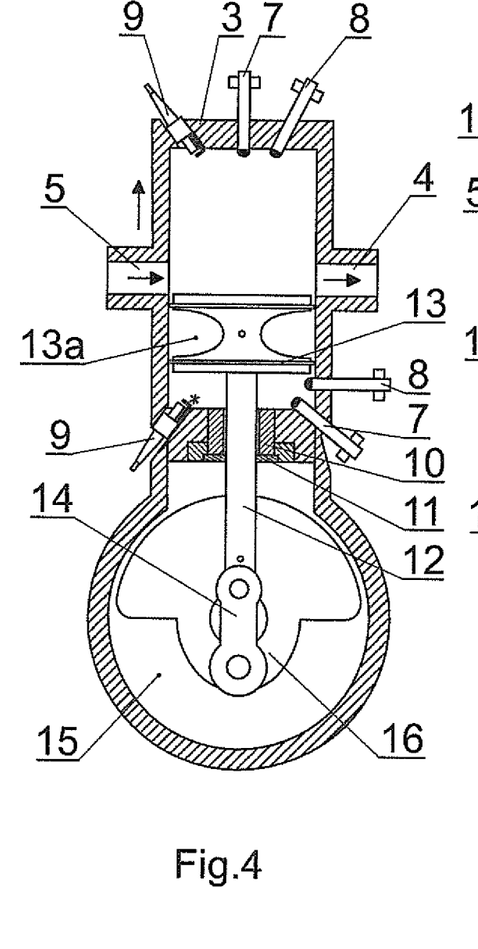
FIG. 4 depicts the compression moment in the lower combustion chamber and scavenging in the upper combustion chamber.
Figure 5:
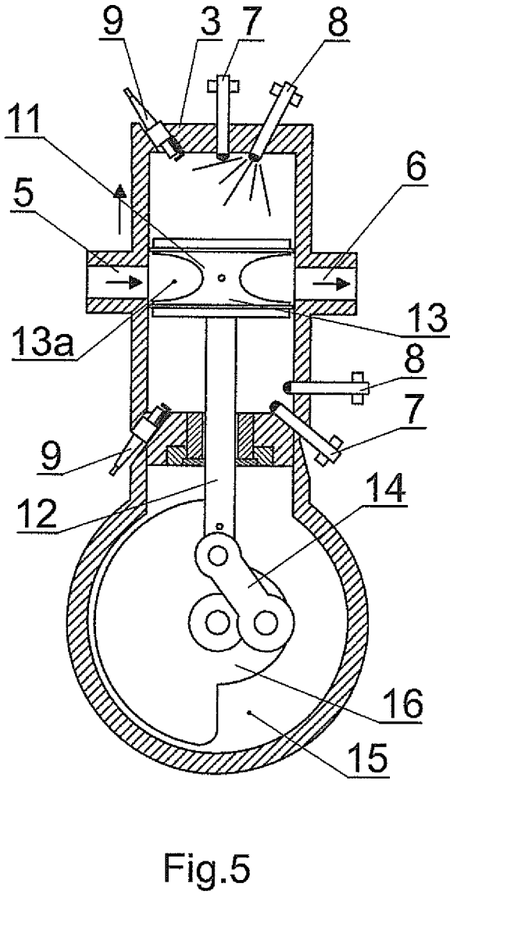
FIG. 5 shows the engine in the course of the piston motion towards TDC as well as the fuel injection into the upper combustion chamber.

The engine operation according to the first version of the invention is as follows: as it is shown in FIG. 2, the compressed fuel in the cylinder space 2 above the piston 13, namely the upper combustion chamber, is ignited by the spark plug 9 at TDC and then the piston 13 is pushed downwards towards the crankcase 15. At the time when the piston 13 is placed on the axis of the inlet channel of compressed air 5 and the outlet exhaust channel 6, compressed air scavenges and refrigerates the internal surface of its pit 13*a* as well as the surface of the cylinder 2 situated between the sealing rings 13*h*. Furthermore, in this phase of the engine operation, fuel derived from the lower fuel injector 7 is supplied to the cylinder space 2 under the piston 13, which constitutes the lower combustion chamber, as it is presented in FIG. 3. This fuel undergoes compression during the downward motion of the piston 13 towards the crankcase 15. Simultaneously, the piston 13 opens the inlet channel of compressed air 5 and the outlet exhaust channel 6 for the upper part of the cylinder 2, and as a result air supplied to this part of the cylinder 2 pushes out the burnt gases. As the piston 13 reaches BDC, as shown in FIG. 4, the ignition of fuel supplied there occurs by the lower spark plug 9, and then the piston 13 is pushed downwards towards the crankcase 15. At the time when the piston 13 moves upwards into the axis of the inlet channel of compressed air 5 and the outlet exhaust channel 6, compressed air once again scavenges and refrigerates the internal surface of its pit 13*a* and the cylinder space 2 located between the sealing rings 13*b*, while the fuel derived from the upper fuel injector 7 is supplied to the cylinder space above the piston 13, as illustrated in FIG. 5. In the subsequent upward motion of the piston 13 the compression of fuel occurs in the upper part of the cylinder 2 and at the same time air supplied by the inlet channel of compressed air 5 of the lower part of the cylinder 2 scavenges this place, which is illustrated in FIG. 2, and the cycle of the engine operation is repeated.

In the cycle of the engine operation that is being described, following the ignition of the compressed fuel in the cylinder space 2 above the piston 13, as well as in the proper phase of this cycle, following the ignition of the compressed fuel in the cylinder space 2 above the piston 13, a little amount of water is supplied to these spaces via the water injector 8 assigned to this combustion chamber of the cylinder 2. Water is supplied by the water pipe 23 from the water container 22 through the water heating element 20 in this example it is made in the form of the spiral metal tube, embedded on the exhaust manifold 19 as well as through the metering device 21. Water undergoes initial heating in the heating element 20 approximately up to 100 degrees centigrade, whereas in the metering device 21, whose work is steered by the external system of steering the engine operation, measurement of the amount of water as well as the moment of injection into the cylinder space 2 take place.

The reciprocating motion of the piston 13 is transferred by the piston rod 10 onto the connecting rod 14, which subsequently, via the crank of the crankshaft 16, makes this shaft move rotationally. The piston rod 12 moves in the linear slide bearing 10 embedded on the partition 4, which ensures stable maintenance of the rectilinear motion of the piston rod 12, and moreover with the support of the easily replaced sealing element 9 it enables proper sealing of the piston rod 12 transitions through the partition 4.

The engine operation according to the second version of the invention is similar to the aforementioned version, however it differs in that the same processes take place simultaneously in three cylinders, shifted reciprocally in the phase by the angle 120 degrees. In this engine the piston rods 42 in the appropriate order influence the connecting rods 44 attached to them, which with the help of the intermediary plate 48 embedded on the crank of the crankshaft 46 make this crankshaft move rotationally. Also in this version of the engine according to the invention the effective disconnection of the cylinder space 32 from the crankcase space 45 is provided, which facilitates the construction of the light, powerful and ecological engine that can be used in various ways.

The separate lubricating system, known from four-stroke engines, is used in order to lubricate the piston and crank unit of this engine. It uses internal oil channels 51 situated in the piston rods 42

The invention claimed is:

1. An internal combustion engine comprising:
   an engine case with the connecting rod unit and cylinders, attached to it and closed from above by the cylinder heads, inside which there are bilateral reciprocating pistons with sealing rings that divide internal spaces of cylinders into two combustion chambers, with piston rods situated on the one side of pistons, which by their ends go beyond chambers of cylinders extending through linear slide bearings located in lower partitions of the cylinders, and
   ignition elements, in the form of a spark plug or a glow plug, and fuel injectors that transfer fuel into combustion chambers, wherein, in the middle of the cylinder fastened to the engine case there are at least one inlet channel of compressed air and at least one outlet exhaust channel, moreover in the head of the cylinder as well as in the lower partition at least one fuel injector and at least one ignition element, are situated in pairs, spaced apart from a linear slide bearing, embedded in the middle of the lower partition,
   wherein the piston shaft passes through the linear slide bearing and an annular sealing element,
   wherein the piston rod shaft has lubricating passage formed there through extending between the bilateral reciprocating piston and the engine case,
   wherein an upper end of the piston rod is rigidly attached to the bilateral reciprocating piston, and a lower end is pivotably connected to a connecting rod situated in the crankcase, which is rotationally connected to a crank of a crankshaft; and
   wherein, the bilateral reciprocating piston has a side wall surface located between spaced apart piston rings forming recess creating an annular cavity.

2. The engine according to claim 1, wherein, in the head and/or in the upper part of the cylinder wall as well as in the partition and/or in the lower part of the cylinder wall there is at least one water injector situated additionally and in pairs.

3. The engine according to claim 2, wherein, the water injectors are connected to the water container by the water pipe through the metering device attributed to them.

4. The engine according to claim 3, wherein, between the water container and particular metering devices there is the water heating element, which is embedded on the exhaust manifold that is attached to the outlet exhaust channel.

5. The internal combustion engine comprising:
an engine case with connecting rod units and cylinders, attached to it and closed from above by cylinder heads, inside of the cylinders are bilateral reciprocating pistons with sealing rings that divide internal spaces of cylinders into two combustion chambers, with piston rods situated on the one side of pistons, having ends that go beyond chambers of cylinders extending through linear slide bearings located in lower partitions of cylinders, and
ignition elements in the form of a spark plug or a glow plug, and fuel injectors that transfer fuel into combustion chambers,
wherein, at least one inlet channel of compressed air and at least one outlet exhaust channel are situated in the middle of each of at least three cylinders fastened to the engine case in the radial system,
wherein, in the head of each cylinder as well as in its partition there are at least one fuel injector and at least one ignition element located in pairs, apart from that the linear slide bearing, embedded in the middle of each partition through which the piston rod extends passing through an annular sealing element and a slide bearing,
wherein, the bilateral reciprocating piston has a side wall surface located between spaced apart piston rings forming a recessed annular cavity,
wherein, the upper end of each piston rod is stiffly connected to the bilateral reciprocating piston, whereas its lower end is connected to the connecting rod, located in the crankcase, in an oscillating manner via a crank pin assigned to it in the intermediary plate embedded on the crank of this crankshaft.

6. The engine according to claim 5, wherein the piston rod shaft has lubricating passage formed there through extending between the recessed annular cavity in the bilateral reciprocating piston and the engine case.

7. The engine according to claim 5, wherein, in each head and/or in the upper part of the wall of each cylinder and in each partition and/or in the lower part of the wall of each cylinder there is at least one water injector situated additionally in pairs.

8. The engine according to claim 7, wherein, water injectors are connected to the water container by water pipes through metering devices attributed to them.

9. The engine according to claim 8, wherein, between the water container and particular metering devices there is the water heating element, which is embedded on the exhaust manifold attached to the outlet exhaust channel.

* * * * *